United States Patent
Griffin et al.

(10) Patent No.: US 11,753,152 B2
(45) Date of Patent: *Sep. 12, 2023

(54) SYSTEM FOR ROLLING LANDING GEAR

(71) Applicant: BETA AIR, LLC, South Burlington, VT (US)

(72) Inventors: Riley Clinton Griffin, Montpelier, VT (US); Kyle B. Clark, Underhill, VT (US); Raffaello Verna, Creedmoor, NC (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,512

(22) Filed: Dec. 16, 2021

(65) Prior Publication Data
US 2022/0289366 A1    Sep. 15, 2022

Related U.S. Application Data

(63) Continuation of application No. 17/196,719, filed on Mar. 9, 2021, now Pat. No. 11,230,372.

(51) Int. Cl.
*B64C 25/52* (2006.01)
*B64C 25/62* (2006.01)
*B64C 25/66* (2006.01)

(52) U.S. Cl.
CPC .............. *B64C 25/52* (2013.01); *B64C 25/62* (2013.01); *B64C 25/66* (2013.01)

(58) Field of Classification Search
CPC .......... B64C 25/52; B64C 25/62; B64C 25/66
See application file for complete search history.

(56) References Cited

U.S. PATENT DOCUMENTS

| | | | | |
|---|---|---|---|---|
| 2,532,610 A | * | 12/1950 | Ditter | B64C 25/66 244/108 |
| 2,733,026 A | * | 1/1956 | Ditter | B64C 25/66 244/108 |
| 2,925,970 A | * | 2/1960 | Heaslip | B64C 25/22 244/108 |
| 2,977,073 A | * | 3/1961 | Ditter | B64C 25/66 244/108 |
| 3,128,065 A | * | 4/1964 | Landes | B64C 25/66 244/108 |
| 4,390,151 A | * | 6/1983 | Schneider | B64C 25/52 280/7.14 |
| 5,065,958 A | * | 11/1991 | Stubstad | B64C 25/52 244/101 |
| 2015/0012154 A1 | * | 1/2015 | Senkel | B64C 27/473 701/4 |
| 2016/0221670 A1 | * | 8/2016 | Robinson | B64C 25/66 |
| 2019/0233134 A1 | * | 8/2019 | Don | B64F 1/22 |

* cited by examiner

*Primary Examiner* — Tye William Abell
(74) *Attorney, Agent, or Firm* — CALDWELL INTELLECTUAL PROPERTY LAW

(57) ABSTRACT

A system for rolling landing gear is illustrated. System includes a skid component attached to an aircraft and comprising at least a skid tube oriented laterally to a longitudinal axis of the aircraft. System also includes at least a wheel journaled on a rotational fulcrum and at least a biasing means attaching the rotational fulcrum to the skid tube, wherein the biasing means comprises at least a leaf spring and exerts a recoil force resisting upward displacement of the rotational fulcrum with respect to the skid tube.

20 Claims, 5 Drawing Sheets

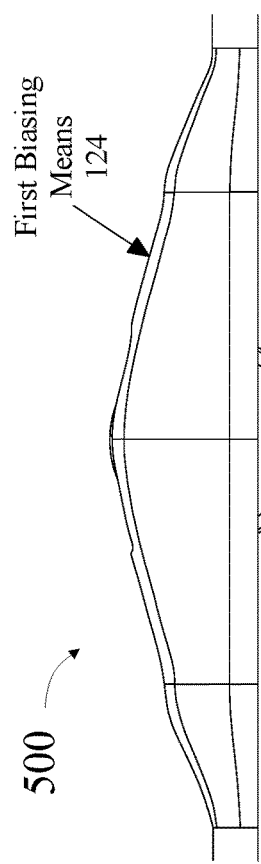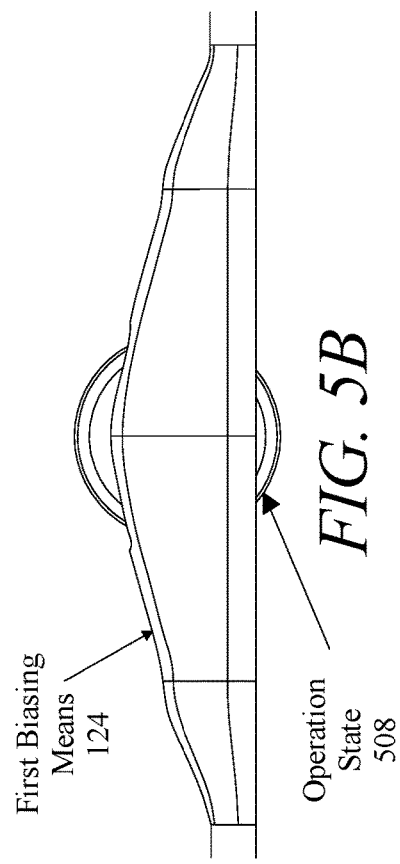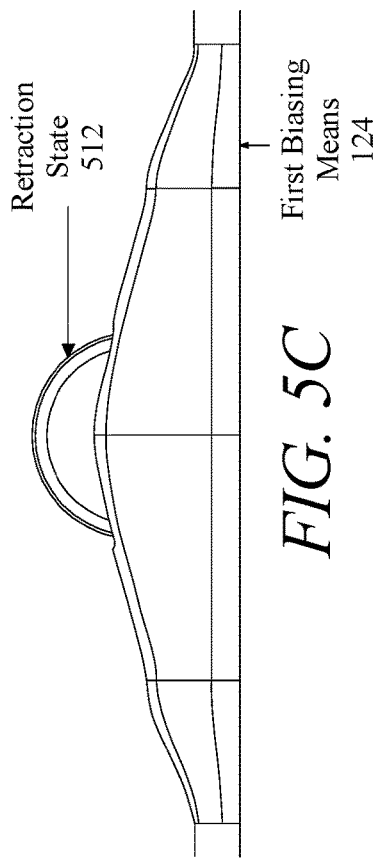

SYSTEM FOR ROLLING LANDING GEAR

FIELD OF THE INVENTION

This application is a Continuation of U.S. application Ser. No. 17/196,719 filed Mar. 9, 2021, entitled "SYSTEM FOR ROLLING LANDING GEAR," all of which are hereby incorporated by reference in their entirety.

BACKGROUND

Accidents occurring during a vertical landing with a large force often results in a large impact and/or damage to the aircraft due to the ground impact. In these type of accidents, the landing gear system, whether of the skid-type or the wheel-type, is often the first element of the aircraft to impact the ground. Unfortunately, landing gear systems are often designed that are incapable of attenuating or dissipating a large degree of the impact energy experienced in a crash-landing situation.

SUMMARY OF THE DISCLOSURE

In an aspect, a system for rolling landing gear is illustrated. System includes a skid component attached to an aircraft and comprising at least a skid tube oriented laterally to a longitudinal axis of the aircraft. System also includes at least a wheel journaled on a rotational fulcrum and at least a biasing means attaching the rotational fulcrum to the skid tube, wherein the biasing means comprises at least a leaf spring and exerts a recoil force resisting upward displacement of the rotational fulcrum with respect to the skid tube.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 5A-C are diagrammatic representations illustrating various states of an exemplary embodiment of a system for rolling landing gear;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems for rolling landing gear. In an embodiment, this allows for enhanced safety during a crash landing. Aspects of the present disclosure can be used to reduce a downward force as a function of a crash landing. This is so, at least in part, due to a first biasing means and a second biasing means. Aspects of the present disclosure allow for a system for rolling landing gear. Exemplary embodiments illustrating aspects of the present disclosure are described below in the context of several specific examples.

Figure 1:
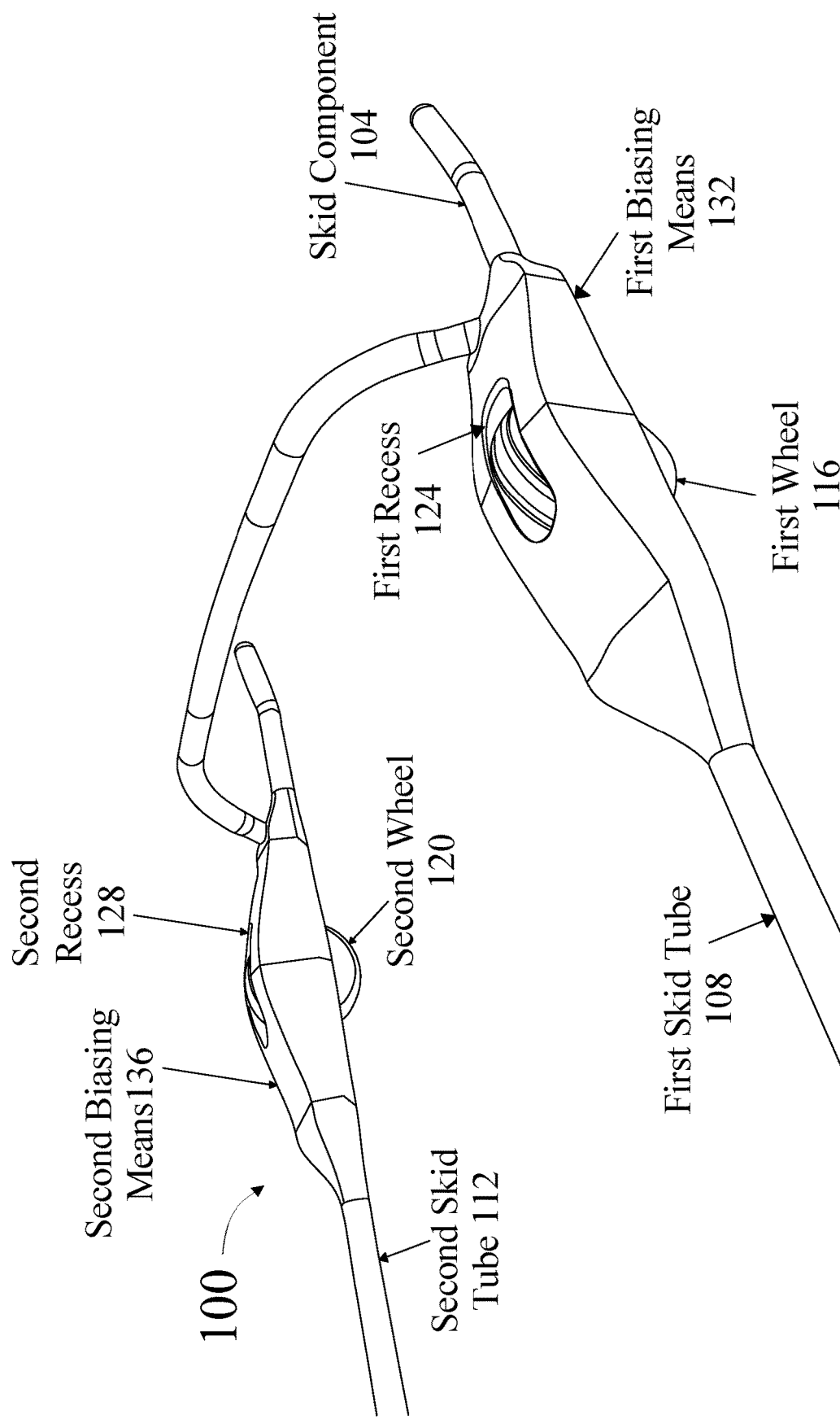
FIG. 1 is a diagrammatic representation of an exemplary embodiment of a system for rolling landing gear.

Referring now to the drawings, FIG. 1 illustrates an exemplary embodiment of a system 100 for rolling landing gear. System 100 is comprised of a skid component 104 attached to an aircraft. As used in this disclosure a "skid component" is a component of an undercarriage of an aircraft that supports the weight of the aircraft when it is not in the air. For example, and without limitation, skid component 104 may include a simple landing skid, wherein a simple landing skid may consist of two or more beams, rods, and/or braces that run parallel to one another with a distance separating the two beams, rods, and/or braces. As a further non-limiting example, a skid component may include one or more skis. Skid component 104 may be composed of wood, fabric, aluminum, steel, titanium, polymers, graphite-epoxy, composites, and the like thereof. Skid component 104 may be designed with a consideration of energy absorption during a landing, stress levels in normal landings, and/or an appropriate stiffness to avoid critical ground resonance modes. As used in this disclosure, "attached" means that at least a portion of a device, component, or circuit is connected to at least a portion of the aircraft via a mechanical coupling and/or attachment and/or fastening component and/or mechanism. Attachment may be accomplished, without limitation, by bolting, riveting, welding, press fitting, and the like thereof. For example, and without limitation a solid and/or round head rivet may be used to attach a skid component to an aircraft. As a further non-limiting example, a blind and/or pop rivet may be used to attach a skid component to an aircraft. As a further non-limiting example, an oxy-acetylene weld and/or electric arc weld may be used to attach a skid component to an aircraft. As a further non-limiting example, a shielded metal arc weld and/or gas metal arc weld may be used to attach a skid component to an aircraft. As a further non-limiting example, a composite press-fit insert may be used to attach a skid component to an aircraft.

Still referring to FIG. 1, an "aircraft", as described herein, is a vehicle that travels through the air. As a non-limiting example, aircraft may include airplanes, helicopters, airships, blimps, gliders, paramotors, and the like thereof. Additionally or alternatively, an aircraft may include one or more electric aircrafts and/or hybrid electric aircrafts. In an embodiment, mechanical coupling may be used to connect the ends of adjacent parts and/or objects of an electric aircraft. Further, in an embodiment, mechanical coupling may be used to join two pieces of rotating electric aircraft components. System 100 may be configured to enable a rolling take takeoff. As used in this disclosure a "rolling takeoff" is an action of becoming airborne as a function of rolling on the ground for some time with acceleration. As a non-limiting example a rolling takeoff may include a takeoff in which the aircraft does not stop on the runway when it enters the taxi track, but continues the takeoff by opening the throttle either during the turn or immediately after rolling out. System 100 may be configured to enable a rolling landing. As used in this disclosure a "rolling landing" is a movement of an aircraft from touchdown through deceleration to taxi speed and/or full stop. As a non-limiting example, a rolling landing may include an aircraft that is returning to the ground may approach the ground with a certain forward moving force, wherein the aircraft may touchdown and continue moving in the direction of the forward moving force, while rolling to decelerate.

Still referring to FIG. 1, skid component 104 comprises a skid tube. As used in this disclosure a "skid tube" is an elongated member having a tubular form used in a skid component as described above, and designed and/or configured to support weight of an aircraft when contacting the ground; a skid tube may be attached to an aircraft by way of a bracing structure such as one or more landing struts or the like. A skid tube may be constructed, without limitation, as a monolithic tube defining a ground contact plane for contact with a ground surface. A skid tube may have a first portion having a cross-section defining first and second axis with the first axis, the second axis and a longitudinal axis of the first portion extending perpendicularly to each other and intersecting at a common point, one of the first and second axis extending along a minimum outer cross-sectional dimension of the cross-section of the first portion, the first axis extending at a smaller angle with respect to the ground contact plane than the second axis. Skid tube may be composed of one or more materials comprised of aluminum alloys, titanium alloys, steel alloys, polymers, polymer composites, tungsten carbides, and the like thereof. In an embodiment, a skid tube may be designed to absorb energy and/or preclude extensive damage to an aircraft in the event of a landing and/or crash. In an embodiment skid tube may be hollow and/or void of a central material. For example, and without limitation a skid tube may be a hollow aluminum shaft consisting of a minimum thickness of aluminum to support the aircraft.

In an embodiment and still referring to FIG. 1, system 100 includes a first skid tube 108 oriented laterally to the longitudinal axis of the aircraft. As used in this disclosure a "first skid tube" is a skid tube that is located directly underneath the aircraft to at least prevent damage to the body of the aircraft. First skid tube 108 may be comprised of any material disclosed above, such as aluminum alloys, titanium alloys, steel alloys, polymer composites, tungsten carbides, and the like thereof. First skid tube 108 may be a recurve and/or bow shape consisting of a first portion connected to a second portion and a third portion, wherein the second and third portion are extensions of the first portion at either end of the first portion. Second and third portion of first skid tube 108 may extend in the longitudinal axis direction. Second and third portion of first skid tube 108 may be angled at a degree offset from one of the first axis and/or second axis.

Still referring to FIG. 1, skid component 104 comprises a second skid tube 112 oriented laterally to the longitudinal axis of the aircraft. As used in this disclosure a "second skid tube" is a skid tube that is located directly underneath the aircraft and parallel to first skid tube 108 to at least prevent damage to the body of the aircraft. Second skid tube 112 may be separated by first skid tube 108 by a minimum distance. As used in this disclosure a "minimum distance" is a distance that is required to at least support the aircraft from contacting the ground when not in the air. As a non-limiting example, a minimum distance may include a minimum distance of 2.7432 m and/or 9 ft to support the aircraft. Second skid tube 112 may be comprised of any material disclosed above, such as aluminum alloys, titanium alloys, steel alloys, polymer composites, tungsten carbides, and the like thereof. Second skid tube 112 skid tube 108 may be a recurve and/or bow shape consisting of a first portion connected to a second portion and a third portion, wherein the second and third portion are extensions of the first portion at either end of the first portion. Second and third portion of second skid tube 112 may extend in the longitudinal axis direction. Second and third portion of first skid tube 108 may be angled at a degree offset from one of the first axis and/or second axis. Second skid tube 112 may be any shape and/or of any material suitable for first skid tube 108. In an embodiment and without limitation second skid tube 112 may be the same shape and/or a mirror image of first skid tube 108. In another embodiment, and without limitation, first skid tube 108 and second skid tube 112 may be connected at one and/or both ends. As an example, first skid tube 108 and second skid tube 112 may be formed together at a connection point, wherein the connection point allows first skid tube 108 and second skid tube 112 to be oriented along a longitudinal axis.

Still referring to FIG. 1, skid component 104 may be rated for a G-force. As used in this disclosure a "g-force" is a measurement of the type of force per unit mass that causes a perception of weight. G-force may include a force exerted as a function of an acceleration, wherein an acceleration may include linear acceleration, radial acceleration, and/or angular acceleration. As a non-limiting example, a G-force may be exerted as a function of a change in speed in a straight line, such as during takeoff, landing, and/or in level flight when a throttle setting is changed. As a further non-limiting example a G-force may be exerted as a function of a result in a change in direction, such as when a pilot performs a sharp turn, pushes over into a dive, and/or pulls out of a dive. As a further non-limiting example a G-force may be exerted as a function of a simultaneous change in speed and direction, such as during a spin maneuver and/or a climbing turn. In an embodiment and without limitation skid component 104 may be rated for up to 3.4G.

In an embodiment and still referring to FIG. 1, and without limitation, system 100 may include a crosstube connecting second skid tube 112 to first skid tube 108. As used in this disclosure a "crosstube" is a rod, shaft, and/or tube that is oriented along a perpendicular axis to the longitudinal axis and traverses the minimum distance between the first skid tube and the second skid tube to attach to the first and second skid tube. In an embodiment, and without limitation, crosstube may have a circular and/or rectangular cross-section to facilitate bending of crosstubes to a desired shape. Crosstubes may include a uniform cross-section of a uniform thickness. System 100 may include one or more crosstubes to connect first skid tube 112 to first skid tube 108. For example, and without limitation, a front crosstube may connect second skid tube 112 to first skid tube 108, wherein a front crosstube connects just below the nose of the aircraft, and a rear crosstube may connect second skid tube 112 to first skid tube 108, wherein a rear crosstube connects just below the tail of the aircraft. Crosstube may be comprised of any of the materials suitable for use in construction of skid tubes as described above, such as but not limited to aluminum alloys, titanium alloys, steel alloys, polymer composites, tungsten carbides, and the like thereof. Crosstube may be designed to absorb energy during a landing, to handle stress levels in normal landings, or the like. Crosstube may be constructed with an appropriate stiffness to avoid critical ground resonance modes. For example, and without limitation a crosstube with a high stiffness may act similar to a stiff spring, wherein no and/or insufficient plastic deformation occurs allowing high loads to be transferred to the fuselage, and requiring airframe reinforcing. As a further non-limiting example a crosstube with a stiffness that is too low may result in deformations and/or malfunctions of the cross tube, which may damage the fuselage due to impact with the ground.

Still referring to FIG. 1, system 100 includes a wheel. As used in this disclosure a "wheel" is a circular, disc-shaped, and/or annular object that revolves on an axle and/or fulcrum, which may be at a geometric center of the wheel and is fixed below the aircraft and/or other object to enable it to move easily over the ground. As a non-limiting example, a wheel may include an aircraft wheel. Wheel includes an aircraft tire. As used in this disclosure an "aircraft tire" is an annular component attached to and/or surrounding a rim and/or hub of a wheel such that the tire contacts a surface on which the wheel rests instead of the rim. A tire may be composed at least in part of an elastomeric material such as rubber. An aircraft tire may include an interior lumen or sealed chamber, which may also be annular, and which may be filled with pressurized gas to increase the tire's resistance to elastic deformation, permitting it to bear greater weight without allowing the rim to contact the ground. Aircraft tire may be capable of being exposed to temperatures below −40° C. and/or above 200° C. without losing elasticity or integrity. Aircraft tires may be composed of, without limitation rubber, nylon, cord, and/or steel. Aircraft tires may include a tire tread pattern. As used in this disclosure a "tire tread pattern" is a circumferential groove molded into the rubber of the tire to improve traction. For example, and without limitation, a tire tread pattern may be composed of 4 circumferential grooves molded into the aircraft tire to channel water away from the tire surface. In an embodiment and without limitation, tire tread patterns may be designed to maximized the amount of rubber making contact with the ground to decrease the landing distance and/or enhance braking performance.

Still referring to FIG. 1, aircraft tires may be mounted to aircraft wheel hubs and/or rims. As used in this disclosure an "aircraft wheel hub" is the rim of the wheel that is configured to have an inboard wheel rim and an outboard wheel rim. Aircraft wheel rim may bolt together the inboard wheel rim and outboard wheel rim to secure aircraft tires to the aircraft wheel rim. An O-ring may be placed between the inboard and outboard wheel rim to mate the surface and create a sealed connection. In an embodiment, and without limitation, an aircraft wheel rim may be composed of aluminum, magnesium alloys, polymer composites, and the like thereof. Wheels and/or tires may be configured to include a medium for inflation. Medium may consist of any compound and/or substance that may achieve a particular inflation for wheel. Medium may include substances and/or compounds that aid in reducing the chance of fire and/or explosion. In an embodiment and without limitation a medium may include nitrogen, wherein the nitrogen is trapped between the inboard wheel rim, aircraft tire, and outboard wheel rim. Nitrogen may contain no water vapor reducing the amount of moisture, wherein reducing the amount of moisture may mitigate variations of pressures at temperature extremes. Nitrogen may reduce the amount of oxygen in the tires, wherein reducing the amount of oxygen may reduce the oxidizing power to promote explosions and/or fires. Nitrogen may also reduce corrosion to aluminum and/or steel inboard wheel rim and/or outboard wheel rim. Nitrogen may also reduce reduction of tire pressure as nitrogen may be larger molecules that permeate at slower rates than other mediums. As used in this disclosure "tire pressure" is the amount of force and/or pressure that exists within an aircraft tire when sealed. Tire pressure may include tire pressures consisting of 100 psi-300 psi.

In an embodiment and still referring to FIG. 1, wheel may include one or more tire safety devices. As used in this disclosure a "tire safety device" is a safety device incorporated into the wheel to mitigate and/or prevent unsafe conditions from occurring to and/or within the wheel. Tire safety device may include one or more fusible plugs. As used in this disclosure a "fusible plug" is a small hollow bolt with a low melting-point metal that may protect aircraft tires and/or wheels from exploding due to elevated temperatures. For example, and without limitation, fusible plugs may melt at a predetermined temperature to at allow the tire to safely deflate, reducing the chances for an explosion and/or fire. As a further non-limiting example, fusible plugs may be mounted in the inboard wheel rim, wherein the fusible plugs may deflate in the inboard wheel rim to at least force the medium towards a braking mechanism.

Still referring to FIG. 1, tire safety device may include one or more over pressure relief valves. As used in this disclosure an "over pressure relief valve" is a valve that releases gas or otherwise alleviates pressure within a tire when that pressure exceeds some predetermined maximum value. An over pressure relief valve may include, as a non-limiting example, a hollow bolt with a rupture disk inside of the bolt. In an embodiment, and without limitation, rupture disk may rupture when the pressure of the medium inside of the wheel exceeds a design limit. As used in this disclosure a "design limit" is a limit that is established for a maximum pressure. For example, and without limitation, a design limit may include a pressure consisting of 375 psi. As a further non-limiting example a design limit may include 450 psi. Over pressure relief valve may be installed on aircraft wheel hubs to protect tires from over-pressure and/or explosion during a landing, takeoff, and/or servicing of the wheel. Additionally or alternatively, tire safety device may include one or more tire pressure monitoring systems. As used in this disclosure a "tire pressure monitoring system" is a system that senses the tire pressure for the wheels. Tire pressure monitoring system may include one or more sensors that are capable of detecting a tire pressure. For example, and without limitation, sensors may include a potentiometric pressure sensor, inductive pressure sensor, capacitive pressure sensor, piezoelectric pressure sensor, strain gauge pressure sensor, variable reluctance pressure sensor, and the like thereof. In an embodiment and without limitation, tire pressure monitoring system may output an alert to a pilot of the aircraft to signal that the tire pressure is low. As used in this disclosure an "alert" is a notification and/or signal that captures the attention of the pilot to convey a message and/or meaning. Alert may include any electronic, mechanical, visual, and/or sound signal. For example, and without limitation an alert may be outputted by tire pressure monitoring system to convey a message of low tire pressure to the pilot. As a further non-limiting example, an alert may be outputted by tire pressure monitoring system to convey a message of a tire leak to the pilot. As a further non-limiting example, an alert may be outputted by tire pressure monitoring system to convey a rupture and/or over-inflation of a wheel to the pilot.

In an embodiment, and still referring to FIG. 1, tire safety device may include a brake temperature monitoring system. As used in this disclosure, a "brake temperature monitoring system" system that senses the temperature of the braking mechanism. Brake temperature monitoring system may include one or more sensors that are capable of detecting a braking mechanism temperature. For example, and without limitation, a brake temperature monitoring system may include negative temperature coefficient thermistors, resistance temperature detectors, thermocouple, semiconductor-based sensors, and the like thereof. Additionally or alternatively, tire safety device may include one or more tire chines. As used in this disclosure a "tire chine" is an edge and/or sidewall of an aircraft tire that displaces standing water. For example, and without limitation a tire chine may be constructed that deflects standing water outward to reduce water ingestion into an engine and/or propulsor of the aircraft.

Still referring to FIG. 1, system 100 includes a first wheel 116. As used in this disclosure a "first wheel" is a wheel that is journaled on a rotational fulcrum. As used in this disclosure a "rotational fulcrum" is a hinge and/or pivot point that allows a wheel to rotate 360°. Rotational fulcrum may include one or more bearings. As used in this disclosure a "bearing" is a hinge and/or pivot point that constrains relative motion to the desired motion and reduces friction between moving parts. Bearings may provide free linear movement of the moving part and/or free rotation around a fixed axis. Bearings may facilitate the desired motion by minimizing friction. Bearings may hold and/or secure rotating components such as shafts and/or axles within rotational fulcrum that transfers axial and/or radial loads from the source of the load to the structure supporting it. Bearings may include a plain bearing. As used in this disclosure a "plain bearing" is a shaft rotating in a hole. Plain bearings may include, without limitation, a bushing, journal bearing, sleeve bearing, rifle bearing, and/or composite bearing. Bearings may include a rolling element bearing. Bearing may include a flexure bearing. As used in this disclosure a "flexure bearing" is a bearing in which the motion is support by a load element that bends. As a non-limiting example, a flexure bearing may include a bearing capable of angular compliance.

In an embodiment, and still referring to FIG. 1, bearings may be composed of a rolling-element bearing. As used in this disclosure a "rolling-element bearing" is a bearing that places rolling elements between the turning and stationary races to prevent sliding friction. Rolling-element bearing may include one or more ball bearings. As used in this disclosure a "ball bearing" is a bearing comprising an inner and outer race between which balls roll; the balls may bear loads between races, and may be free to roll, resulting in low losses of kinetic energy to friction. For example, and without limitation each race may feature a groove shaped such that the ball fits slightly loose and the ball contacts each race across a narrow area. As a further non-limiting example, a ball bearing may include a ball that deforms slightly where it contacts each race. Rolling-element bearing may include one or more roller bearings. As used in this disclosure a "roller bearing" is a bearing using cylinders slightly greater length than the diameter. In an embodiment and without limitation, roller bearings may have higher radial load capacity than ball bearings, but a lower capacity and higher friction under axial loads. As a non-limiting example roller bearings may include, without limitation, cylindrical rollers, spherical rollers, gear bearings, tapered rollers, needle rollers, toroidal roller bearings, and the like thereof. As a non-limiting example, a tapper roller bearing may include a rolling element bearing that may support axial forces as well as radial forces. In an embodiment, tapered roller bearings may include inner and outer ring raceways that are tapered to form cones.

Still referring to FIG. 1, first wheel 116 is journaled on a first rotational fulcrum, which may be any rotational fulcrum as described above. First wheel 116 may be journaled on first rotational fulcrum about or at an axle. As used in this disclosure an "axle" is a central shaft for rotating a wheel and/or gear. Axle may be fixed to the wheel, rotating with it on a bearing as described above, and/or fixed to the aircraft, with the wheels rotating around the axle on a bearing as described above. Axles may include one or more axle designs. As used in this disclosure an "axle design" is a format and/or style of axle used in an aircraft. Axle design may include a single rigid shaft design, split-axle design, tandem axle design, and the like thereof. Axle may be composed of SAE grade 41xx steel, wherein SAE grade 41xx steel may be composed of chrome-molybdenum steel. Axle may be composed of SAE grade 10xx steel, wherein SAE grade 10xx steel may be composed of carbon steel. In an embodiment, and without limitation, axle may be strengthen using an additive including, but not limited to, chromium alloys, nickel alloys, and/or molybdenum alloys.

Still referring to FIG. 1, a skid tube may have a recess that houses a wheel allowing the wheel to rotate freely contacting the skid tube. For example, and without limitation recess may include an elliptical shape, wherein the ellipsis is elongated along the longitudinal axis of the skid tube. As a further non-limiting example recess may include an oval and/or pyriform shape that extends along the longitudinal axis of the skid tube. In an embodiment recess may include one or more covered cavities that house a wheel. For example, and without limitation a wheel may be house inside of recess, wherein the wheel is secured to the rotational fulcrum as a function of the axis such that the wheel is able to freely rotate and/or retract and/or extend as a function of the biasing means, wherein a biasing means is described in detail below. For example, and without limitation the wheel be enclosed from any objects and/or mediums from interacting with the wheel other than from the bottom opening of the recess. In an embodiment, and without limitation, recess may include a through hole. For example, and without limitation a through hole may include an elliptical shape, oval shape, pyriform shape, and the like thereof, that is uncovered on both the top and the bottom of the recess such that the wheel is able to freely rotate without contact from the skid tube. For example, and without limitation, a wheel may be secured in a through hole, such that the top and bottom of the wheel may be exposed to the surrounding ground and/or mediums, wherein the wheel is able to rotate freely and/or retract and/or extend as a function of the biasing means, wherein a biasing means is described in detail below.

Still referring to FIG. 1, first skid tube 108 may have a first recess 124. As used in this disclosure a "first recess" is a located within first skid tube 108 housing first wheel 116, such that first wheel 116 does not interact and/or contact first skid tube 108. For example, first recess 124 may include a cavity surrounding first wheel 116, wherein first wheel 116 is able to freely rotate and/or retract and/or extend without making contact with the surrounding cavity of first skid tube 108. As a further non-limiting example, first recess 124 may include a through hole surrounding first wheel 116, wherein first wheel 116 is able to freely rotate and/or retract and/or extend without contacting the surrounding first skid tube 108. In an embodiment and without limitation, first recess 124 may include an oval and/or capsule shape to allow first wheel 116 to rotate freely and/or retract and/or extend as described above, in detail. First recess 124 may allow for first wheel to move along a vertical axis. For example, and without limitation, first recess 124 may allow first wheel 116 to retract and/or extend along a vertical axis through first recess 124 freely.

Still referring to FIG. 1, system 100 includes a second wheel 120. As used in this disclosure a "second wheel" is a wheel that is journaled on a second rotational fulcrum. Second wheel 120 and/or second rotational fulcrum may be implemented in any manner suitable for implementation of first wheel 116 as described above. Second wheel 120 may be journaled to second rotational fulcrum as a function of a bearing, which may include any bearing as described in this disclosure. Additionally or alternatively, second skid tube 112 may have a second recess 128, which may be implemented in any manner suitable for the implementation of first recess 124. For example, second recess 128 may include any means of housing second wheel 120 in a manner suitable for the implementation of first skid tube. In an embodiment and without limitation, second recess 128 may include any oval, capsule, elliptical, and/or pyriform shape to allow second wheel 120 to rotate freely and/or retract and/or extend similar to first recess 124. Second recess 128 may allow for second wheel to move along a vertical axis in a manner suitable for the implementation of first recess 124.

In an embodiment and still referring to FIG. 1, system 100 includes a biasing means attaching the rotational fulcrum to the skid tube. As used in this disclosure a "biasing means" is a mechanism that generates an elastic recoil force when moved or deformed. In an embodiment, biasing means may include a mechanism that generates an elastic recoil force when twisting a material. In another embodiment biasing means may include a mechanism that generates an elastic recoil force when compressing a material. In another embodiment, biasing means may include a mechanism that generates an elastic recoil force when stretching a coiled material. As a non-limiting example a biasing means may be a rubber band and/or other elastic and/or elastomeric material that may compress, stretch, and/or twist such that the rubber band releases stored energy and returns to the original shape. Additionally or alternatively, biasing means may include one or more shock absorber characteristics. As used in this disclosure a "shock absorber characteristic" is a damper and/or hydraulic device that absorbs shock impulses. In an embodiment a shock absorber characteristic may include a characteristic of a material that converts kinetic energy of the shock into another form of energy, such as heat. In another embodiment a shock absorber characteristic may include a characteristic that converts a first form of kinetic energy, the shock, into a second form of kinetic energy, such as forcing the wheel into the recess.

Still referring to FIG. 1, a biasing means may be comprised of a mechanical component such as a spring. As used in this disclosure a "spring" is an elastic object that stores and/or exerts mechanical energy. Spring may be composed of a spring steel. As used in this disclosure a "spring steel" is steel that is capable of returning to an original shape after displacement, deflection, and/or twisting. For example, and without limitation spring steel may be comprised of low-alloy manganese, medium-carbon steel, high-carbon steel, and the like thereof. As a further non-limiting example, spring steel may be comprised of SAE grade 1070 steel, SAE grade 1074 steel, SAE grade 1080 steel, SAE grade 1095 steel, SAE grade 5160 steel, SAE grade 50CrV4 steel, SAE grade 9255 steel, SAE grade 301 spring-tempered steel, and the like thereof. As a further non-limiting example, spring may be comprised of alloy steel, carbon steel, cobalt-nickel, copper based alloy, nickel based alloy, stainless steel, and/or titanium. Additionally or alternatively, spring may be composed of a non-ferrous material such as phosphor bronze, beryllium copper, and the like thereof.

Still referring to FIG. 1, spring may be comprised of one or more non-metal compositions. For example, and without limitation, spring may be comprised of an elastic polymer. As used in this disclosure an "elastic polymer" is a thermoplastic elastomer that is capable of storing and/or exerting a mechanical force. For example, and without limitation an elastic polymer may include polycarbonate, acetal copolymer polyoxymethylene, acetal homopolymer polyoxymethylene, acrylic, nylon, polyethylene, polypropylene, polystyrene, and the like thereof. Elastic polymers may include a corrosion resistant material that may aid in extending the usage time of the spring. Additionally or alternatively, spring may be comprised of one or more gas springs. As used in this disclosure a "gas spring" is a spring that relies on elastic deformation using compressed as contained within an enclosed cylinder sealed by a sliding piston to pneumatically store potential energy and withstand external force applied parallel to the direction of the piston shaft. In an embodiment and without limitation, gas spring may be comprised of a piston rod, head cap, piston rod wiper, piston rod guide bushing, retaining ring, O-ring, piston rod seal, cylinder, piston, flow-restriction orifice, piston guide bushing, valve, valve-sealing screw, and the like thereof. Gas spring may include one or more standard cylinder springs, fixed-height cylinder springs, spindle only springs, cable cylinder springs, stage cylinder springs, non-rotating cylinder springs, return cylinder springs, auto-return cylinder springs, bouncing cylinder springs, dual-mode cylinder springs, heavy duty cylinder springs, oil damper springs, and the like thereof.

In an embodiment and still referring to FIG. 1, spring may be selected as a function of a calculated mechanical energy. As used in this disclosure a "calculated mechanical energy" is an energy of a spring force that may be calculated as a function of Hooke's Law. As used in this disclosure "Hooke's law" is a law of physics that states that a force (F) needed to extend or compress a spring by some distance (x) scales linearly with respect to that distance that is $$F = -kx$$

wherein k is a constant factor characteristic of the spring, and x is small compared to the total possible deformation of the spring. Additionally or alternatively, a spring may be selected as a function of a maximum beam deflection. As used in this disclosure a "maximum beam deflection" is a maximum amount of displacement a spring may be displaced under a load. Maximum beam deflection may be determined by $$\delta\delta_{max} = \frac{PL^3}{48EI}$$

wherein, I is the second moment of inertia, E is the Young's modulus, P is the force acting on the center of the spring, and L is the length of the spring between the supports.

In an embodiment, and still referring to FIG. 1, spring may be classified depending on how the load force is applied. In an embodiment spring may be classified as a tension and/or extension spring, wherein a tension and/or extension spring is designed to operate with a tension load. For example, and without limitation, a tension and/or extension spring may stretch as the load is applied to it. In another embodiment spring may be classified as a compression spring. As used in this disclosure a "compression spring" is a spring that is designed to operate with a compression load. For example, and without limitation, a compression spring may get shorter as the load is applied to it. In another embodiment spring may be classified as a torsion spring. As used in this disclosure a "torsion spring" is a spring that has an axial force load. For example, and without limitation a torsion spring is a spring that has a load applied such as a torque and/or a twisting force and the end of the spring rotates through an angle as the load is applied. In another embodiment spring may be classified as a constant spring. As used in this disclosure a "constant spring" is a spring that maintains the supported load through the deflection cycle. In another embodiment spring may be classified as a variable spring, wherein a "variable spring", as described herein, is a spring that varies the resistance of the coil to load during the compression. In another embodiment spring may be classified as a variable stiffness spring. As used in this disclosure a "variable stiffness spring" is a spring that may dynamically vary the resistance of the coil to load as a function of a control system. For example, and without limitation, variable stiffness springs may vary their length thereby providing actuation capability as well.

In another embodiment, and still referring to FIG. 1, spring may be classified according to a shape of the spring. For example, and without limitation, spring may be a flat spring, wherein a "flat spring" is a spring made of a flat material. As a further non-limiting example spring may be classified as a machined spring. As used in this disclosure a "machined spring" is a spring that is manufactured by a machining bar stock with a lathe and/or milling operation rather than a coiling operation. For example, and without limitation, machined spring may incorporate features in addition to the elastic element, such as compression, extension, torsion, and the like thereof. Spring may be classified according to a serpentine shape, wherein a "serpentine shape", as used herein, is a zig-zag shape consisting of thick wire. Spring may be classified according to a garter shape, wherein a "garter shape" is a coiled shape connected at each end to create a circular shape. Additionally or alternatively spring may include a/an cantilever spring, coil spring, helical spring, hollow tubing spring, volute spring, hairspring, balance spring, V-spring, Belleville spring, constant-force spring, ideal spring, mainspring, negator spring, progressive rate coil spring, rubber band, spring washer, torsion spring, wave spring, and the like thereof.

In another embodiment, and still referring to FIG. 1, spring may include a leaf spring. As used in this disclosure a "leaf spring" is a flat spring used in the suspension of objects, vehicles, and the like thereof. Lead springs may include one or more semi-elliptical springs, elliptical springs, three quarter-elliptic, quarter elliptic, and/or transverse. Inn an embodiment, leaf spring takes the form of a slender arc-shaped length of spring steel of rectangular cross-section, wherein the center of the arc provides location of the axle, while loops formed at either end provide for attached to the aircraft. Leaf springs may be layered with several leaves tacked on top of each other to aid in damping as well as springing functions. Leaf springs may act as a linkage for holding the axle in position. Leaf springs may be pre-stressed according to one or more shot peening processes. As used in this disclosure a "shot peening process" is a cold working process that produces a comprehensive residual stress layer and modifies the mechanical properties of the leaf spring. Shot peening processes may be performed by striking the leaf spring with a shot and/or force sufficient to create plastic deformation. Shot peening may be used to strengthen and/or relieve stress in leaf springs. Shot peening may be used for sand removal, decoring, descaling, surface finished, and/or other manufacturing processes of leaf springs.

Still referring to FIG. 1, the at least a leaf spring may have two ends. As used in this disclosure an "end" is a termination location for a leaf spring. For example, and without limitation an end may be secured to the aircraft by a machined aluminum clamp. As used in this disclosure a "machined aluminum clamp" is a clamp consisting of aluminum and/or an aluminum alloy that has been machined to be able to secure an end of a leaf spring to the aircraft. For example, a leaf spring may have a first end that is secured to the aircraft by a first machined aluminum clamp and a second end that is secured to the aircraft by a second machined aluminum clamp, wherein the first machined aluminum clamp and the second machine aluminum clamp are separate and distinct. As a further non-limiting example, the first end secured by the first machined aluminum clamp may be located on a first side of first recess 124, wherein the second end secured by the second machined aluminum clamp may be located on a second side of first recess 124, and wherein the first side of first recess 124 and the second side of first recess 124 exist opposite to one another along the longitudinal axis. Leaf spring may include a central section. As used in this disclosure a "central section" is a section of the leaf spring that exists between the first end and the second end. Central section may include an attachment point, wherein the rotational fulcrum may be attached. For example, and without limitation the central section may include an axle that secures first wheel 116 to first skid tube 112.

In an embodiment and without limitation, leaf spring may include at least a carbon prestressed leaf spring. As used in this disclosure a "carbon prestressed leaf spring" is a leaf spring consisting of a carbon and/or steel material. For example, and without limitation carbon pre-stressed leaf spring may include one or more leaf springs comprised of 0.90%-1.0% carbon. As a further non-limiting example, carbon-prestressed leaf spring may have a 3" pre-stress due to a shot peening process. As a further non-limiting example, carbon-prestressed leaf spring may be layered, such that 6 carbon pre-stressed leaves consisting of a 1.375" by 0.313" may be placed on top of one another to aid in the springing function. Carbon prestressed leaf spring may be heat treated after formation to produce greater load capacity, greater range of deflection, and/or better fatigue properties. In an embodiment, and without limitation, carbon-prestressed leaf may include a maximum stress of 367 MPa, wherein an elastic limit is 600 MPa. In another embodiment, carbon-prestressed leaf may include a recoil force of 1965 newtons.

In another embodiment, and without limitation leaf spring may include at least a fiberglass prestressed leaf spring. As used in this disclosure a "fiberglass prestressed leaf spring" is a leaf spring consisting of fiber-reinforced plastic. As a non-limiting example, fiberglass prestressed leaf spring may have a 3" pre-stress due to a shot peening process. As a further non-limiting example, fiberglass prestressed leaf spring may be layered, such that 2 fiber glass pre-stressed leaves consisting of a 1.375" by 0.313" may be placed on top of one another to aid in the springing function. Fiberglass prestressed leaf spring may have a thickened center. In an embodiment a fiberglass prestressed leaf spring may have 4.3-5.5 times the strain energy per storage weight compared to a carbon prestressed leaf spring. In another embodiment, fiberglass prestressed leaf springs may aid in corrosion resistance due to the lack of metallic component. In an embodiment, rotational fulcrum may be inserted through an opening in the thickened center, wherein an opening may include one or more mechanical couplings, as described above in detail. In another embodiment, and without limitation, fiberglass-prestressed leaf may include a maximum stress of 236 MPa, wherein an elastic limit is 440 MPa. In another embodiment, fiberglass-prestressed leaf may include a recoil force of 1263 newtons. Additionally or alternatively, biasing means may include an upper recess. As used in this disclosure an "upper recess" is a notch in the upper region of the biasing means that allows for the thickened center to be placed in. For example, and without limitation the upper recess may house the thickened center of the fiberglass leaf spring, wherein the rotational fulcrum may be inserted to connect the biasing means to the wheel.

In an embodiment, and still referring to FIG. 1, biasing means includes a quantity of carbon prestressed leaves and/or fiberglass prestressed leaves. For example, and without limitation a first quantity of carbon prestressed leaf springs and a second quantity of fiberglass leaf springs may be layered to at least produce a layered leaf spring assembly. In an embodiment, and without limitation, the first quantity of carbon prestressed leaf springs may be greater than the second quantity of fiberglass prestressed leaf springs. For example, the first quantity may be a quantity of 6 carbon prestressed leaf springs, wherein the second quantity may be 2 fiberglass leaf springs. In another embodiment, the first quantity may be more than twice the second quantity. For example, a first quantity of 8 carbon prestressed leaf springs may be more than twice the second quantity of 2 fiberglass leaf springs.

Still referring to FIG. 1, system 100 includes a first biasing means 132 that attaches first rotational fulcrum to first skid tube 108. For example, and without limitation, first biasing means may be comprised of a biasing bracket and/or spring mechanism to at least secure first rotational fulcrum to first skid tube 108. As used in this disclosure a "biasing bracket" is a bracket that connects to first skid tube 108, wherein the bracket houses and/or contains first rotational fulcrum. For example, and without limitation, a biasing bracket may be utilized to attach first rotational fulcrum to first skid tube 108. Additionally or alternatively, biasing bracket may include a caster bracket. As used in this disclosure a "caster bracket" is a bracket that secures first rotational fulcrum to first skid tube 108 as a function of a fork and/or yolk. In an embodiment and without limitation, caster bracket may include a pivot and/or rotational mechanism. For example, and without limitation, caster bracket may include a rigid caster bracket, swivel caster bracket, industrial caster bracket, braking caster bracket, locking caster bracket, kingpinless caster, and the like thereof.

Still referring to FIG. 1, system 100 includes a second biasing means 136 that attaches second rotational fulcrum to second skid tube 112. For example, and without limitation, second biasing means may be comprised of a biasing bracket and/or spring mechanism to at least secure second rotational fulcrum to second skid tube 112, wherein a biasing bracket is a bracket that connects to second skid tube 112, wherein the bracket houses and/or contains first rotational fulcrum. For example, and without limitation, a biasing bracket may be utilized to attach second rotational fulcrum to second skid tube 112. Additionally or alternatively, second biasing means 136 may include a caster bracket to secure second rotational fulcrum to second skid tube 112, wherein a caster bracket is a bracket that secures first rotational fulcrum to first skid tube 108 as a function of a fork and/or yolk, as described above, in detail.

In an embodiment and still referring to FIG. 1, first biasing means 132 and second biasing means 136 exert a recoil force. As used in this disclosure a "recoil force" is a force exerted by first biasing means 132 and second biasing means 136 that resists upward displaced of first rotational fulcrum and second rotational fulcrum with respect to first skid tube 108 and second skid tube 112. For example, and without limitation recoil force may be a force exerted that resists the wheel from moving upwards with respect to first skid tube 108 and second skid tube 112 into first recess 124 and second recess 128. Recoil force may be exerted such that the recoil force is a combination and/or addition of the spring forces exerted as a function of the springs of the plurality of layered springs. In an embodiment, and without limitation. recoil force may be exerted such that first skid tube 108 and second skid tube 112 may be separated from the ground below as a function of a threshold landing force. As used in this disclosure a "threshold landing force" is a minimum force that must be achieved to at least overcome the recoil force and displace first rotational fulcrum and second rotational fulcrum upwards with respect to first skid tube 108 and second skid tube 112. For example, and without limitation a threshold force may be approximately 1.4 times a force exerted on the aircraft by gravity, wherein the force exerted on the aircraft by gravity is determined by $$F = G\frac{m_1 m_2}{r^2}$$

wherein F is the force exerted on the aircraft by gravity, G is the gravitational constant, $m_1$ is the mass of the aircraft, $m_2$ is the mass of the earth, and r is the distance between the centers of the masses.

Still referring to FIG. 1, threshold landing force may be less than or equal to a rating force of first wheel 116 and/or second wheel 120. As used in this disclosure a "rating force" is a maximum force that a tire may withstand without rupturing, exploding, and/or bursting. In an embodiment rating force may be an expression of the tire's strength and capacity. For example, and without limitation rating force may include a rating force of a classification of an aircraft tire such as a type I, type III, type VII, and type VIII. As a further non-limiting example, a type III tire may have a rating force that includes a force not to exceed 160 mph when landing and/or taking off. As a further non-limiting example, a type VIII tire may have a rating force associated with a very high-pressure capable of withstanding a force exceeding 220 mph when landing and/or taking off, but not to exceed 250 mph. Additionally or alternatively, rating force may include a rated load. As used in this disclosure a "rating load" is a recommend weight and/or force that may be exerted on the tires prior to rupturing, exploding, and/or bursting. For example, and without limitation a tire may have a rating load consisting of 3,900 kg and/or 8,600 lbs. As a further non-limiting example, a tire may have a rating load consisting of 884.51 kg and/or 1950 lbs.

Still referring to FIG. 1, rating force may be determined as a function of a ply rating. As used in this disclosure a "ply rating" is a rating of the number of plies in a tire which may correlate to a maximum load the tire may carry, wherein a ply is a fiber encased in rubber. For example, and without limitation a play rating of 6 may be associated 6 plies in the tire. Ply rating may be determined as a function of a bias ply. As used in this disclosure a "bias ply" is a ply that is wrapped at a 30°-60° angle to the direction of rotation of the tire to form the tire and give the tire strength. For example, and without limitation, a bias ply may consist of a 42° angle of the plies to the direction of rotation of the tire. Ply rating may be determined as a function of a radial ply. As used in this disclosure a "radial ply" is a ply that is wrapped at a 90° angle to the direction of rotation of the tire to form the tire and give the tire strength. As a non-limiting example, a radial play may orient the fibers perpendicular to the sidewall and direction of rotation, allowing for higher carrying loads with less deformation.

Still referring to FIG. 1, first biasing means 132 and/or second biasing means 136 may extend and/or retract first wheel 116 and second wheel 120 as a function of a change in a downward force. As used in this disclosure a "downward force" is a force exerted on the aircraft as a function of landing. For example, and without limitation, a downward force may include a force of 5,473 kN as a function of a landing of an aircraft. In an embodiment downward force may exceed recoil force upon landing, wherein first wheel 116 and second wheel 120 retract to allow first skid tube 108 and second skid tube 112 to make contact with the ground and generate a frictional force. In another embodiment downward force may be reduced as a function of first skid tube 108 and second skid tube 112 to making contact with the ground and generating frictional force, wherein the reduction of the downward force may not exceed the recoil force, which may extend first wheel 116 and second wheel 120 and separate first skid tube 108 and second skid tube 112 from the ground.

Figure 2:
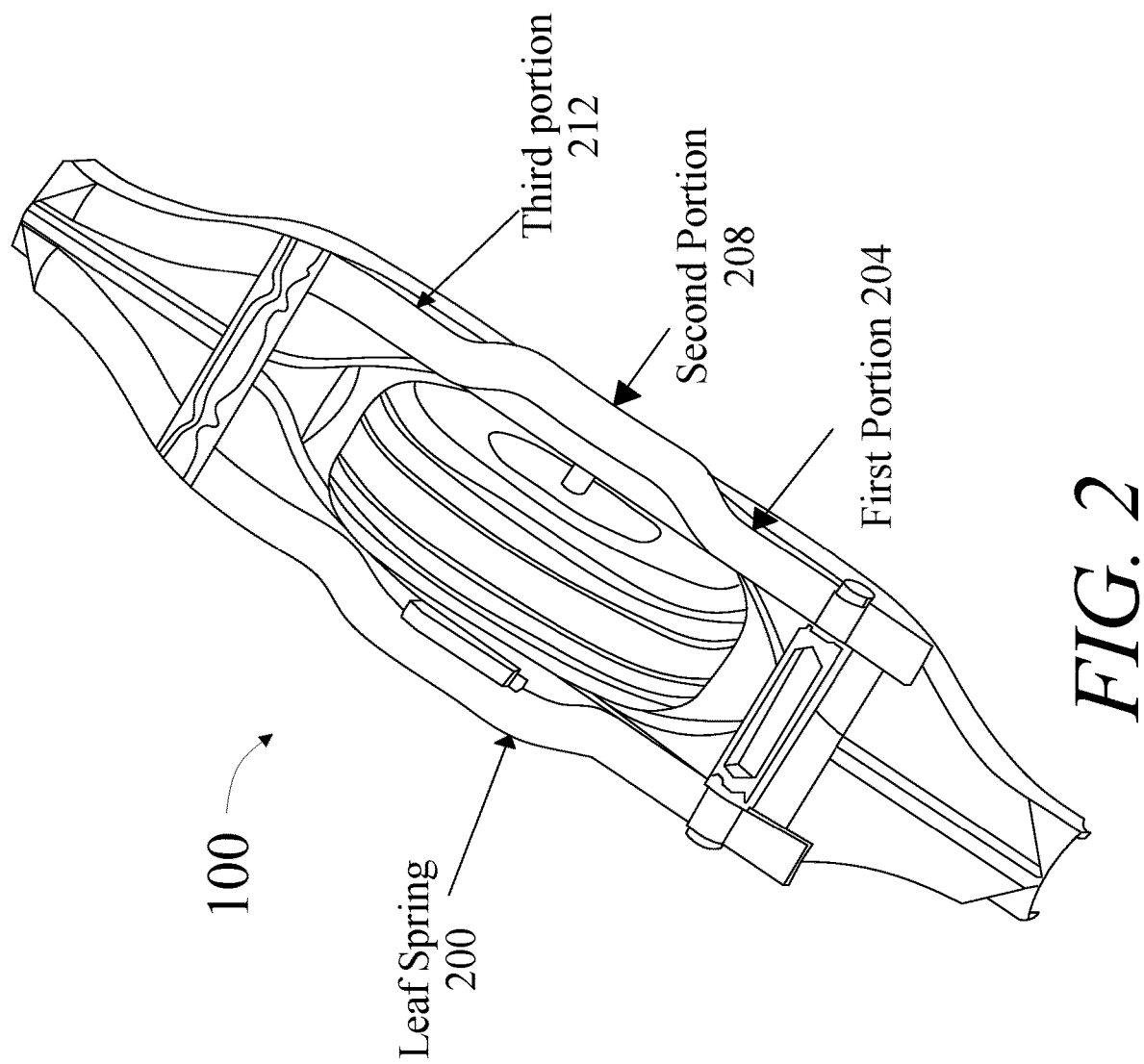
FIG. 2 is a diagrammatic representation of an exemplary embodiment of a system for rolling landing gear.

Referring now to FIG. 2, an embodiment of a system for rolling landing gear 100 is displayed. System 100 includes a leaf spring 200, wherein a leaf spring 200 includes any of the leaf spring as described above, in reference to FIG. 1. Leaf spring 200 may include a first portion 204. As used in this disclosure a "first portion" is a first longitudinal portion that extends from the first end of the leaf spring to a flex point. As used in this disclosure a "flex point" is a point at which the leaf spring extends in an axis not parallel to the longitudinal axis. For example, a flex point may include a point at which the leaf spring bends, shifts, and/or extends into the x and/or y axis. Leaf spring 200 may include a second portion 208. As used in this disclosure a "second portion" is a second longitudinal portion that extends from a first flex point to a second flex point. For example, second portion 208 may exist along the length of the wheel. Leaf spring 200 may include a third portion 212. As used in this disclosure a "third portion" is a third longitudinal portion that is equal and opposite to the first portion 204. As a non-limiting example, third portion 212 may include a portion that extends in the longitudinal direction from the second flex point to the second end of leaf spring 200.

Figure 3:
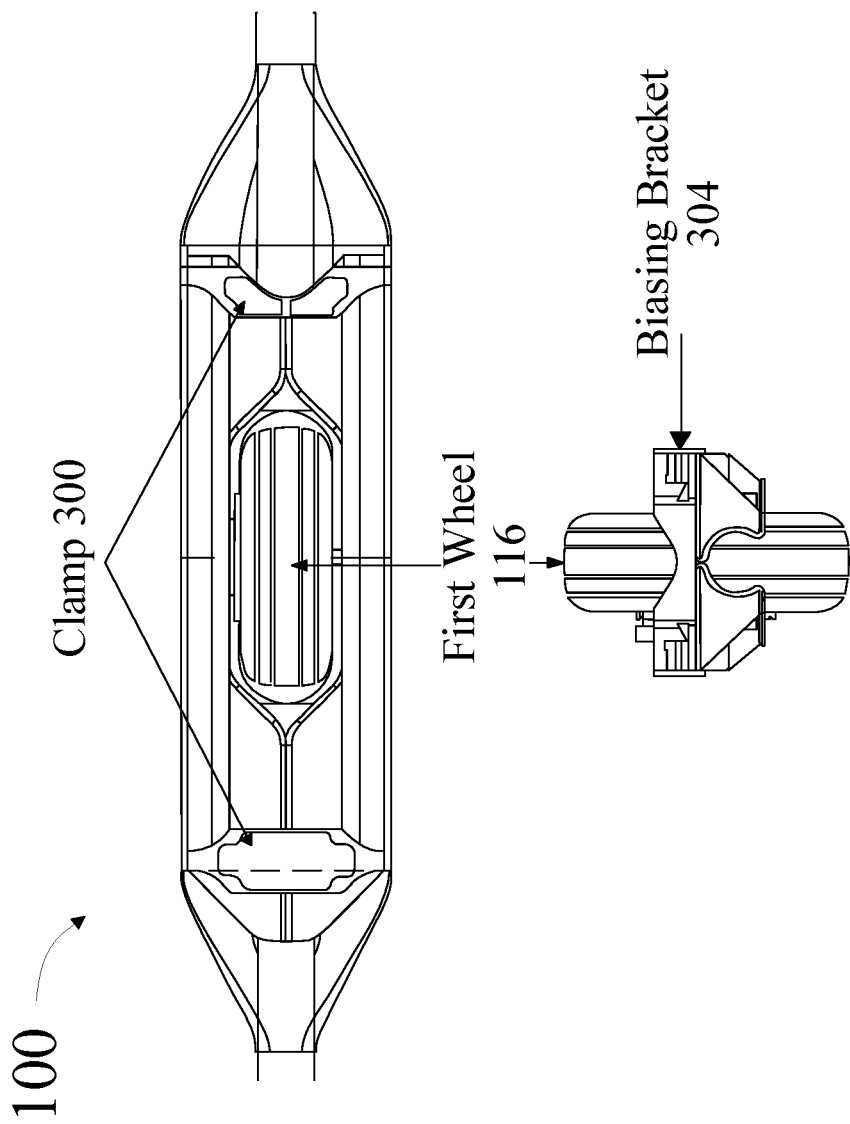
FIG. 3 is a diagrammatic representation of an exemplary embodiment of a system for rolling landing gear.

Referring now to FIG. 3, an embodiment of a system for rolling landing gear 100 is displayed. System 100 may include a clamp 300. As used in this disclosure a "clamp" is a brace, band, and/or clasp used for holding leaf spring to system 100. For example, and without limitation clamp 300 may include a machined aluminum clamp, wherein a machined aluminum clamp is a clamp consisting of aluminum and/or an aluminum alloy that has been machined to be able to secure an end of a leaf spring to the aircraft as described above in detail, in reference to FIGS. 1-2. Clamp 300 may include one or more cradle & bracket support clamps, quick-coupler clamps, T-bolt & multiple take-up clamps, band clamps, and the like thereof. System 100 may include a biasing bracket 304, wherein a biasing bracket is a bracket that connects to first skid tube 108, and wherein the bracket houses and/or contains first rotational fulcrum, as described above in detail, in reference to FIGS. 1-2. Biasing bracket may include first wheel 116 and/or first rotational fulcrum. Biasing bracket may allow attach first wheel 116 and/or first rotational fulcrum to first skid tube 108 as a function of a fitted tubular connector. As used in this disclosure a "fitted tubular connector" is a connector that is fitted to secure to a tube and/or shaft.

Figure 4:
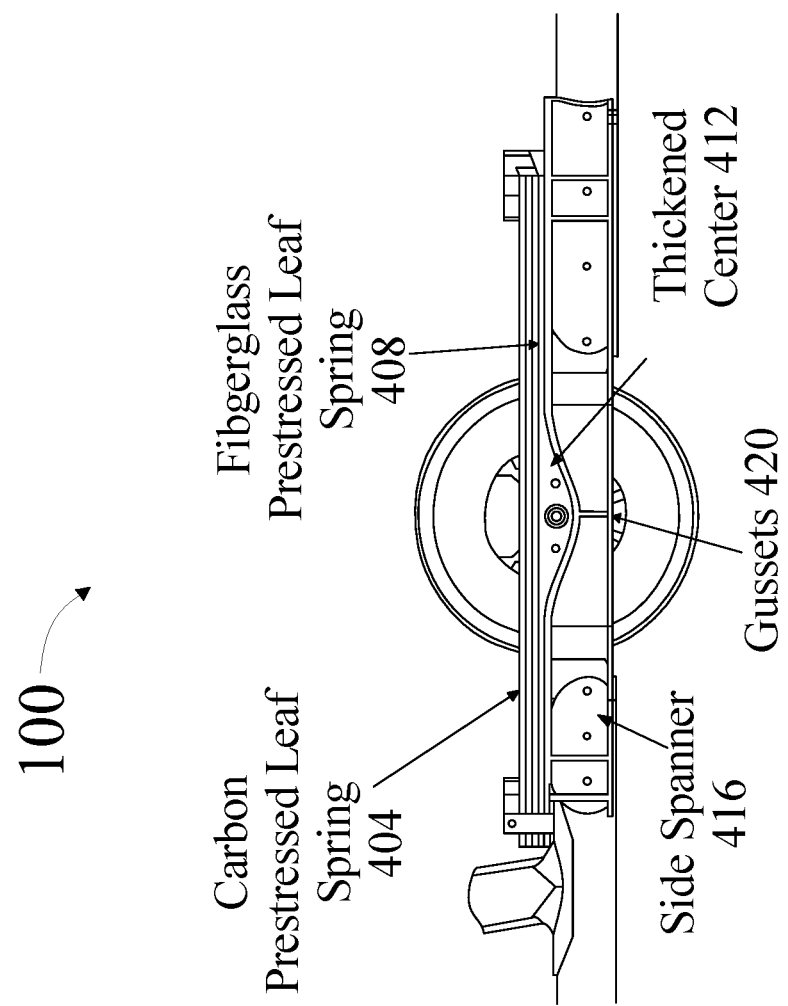
FIG. 4 is a diagrammatic representation of an exemplary embodiment of a biasing means.

Referring now to FIG. 4, an embodiment of a system for rolling landing gear 100 is displayed. System 100 includes a carbon prestressed leaf spring 404, wherein a carbon prestressed leaf spring 404 includes any of the carbon prestressed leaf spring as described above, in reference to FIGS. 1-3. Carbon prestressed leaf spring 404 may be overlaid on top of a fiberglass prestressed leaf spring 408, wherein a fiberglass prestressed leaf spring 408 includes any of the fiberglass prestressed leaf spring as described above, in reference to FIGS. 1-3. Fiberglass prestressed leaf spring 408 may be placed below carbon prestressed leaf spring 404 and may include a thickened center 412. Thickened center 412 includes any of the thickened center as described above in detail, in reference to FIGS. 1-3. Thickened center 412 may attached to first rotation fulcrum. Additionally or alternatively, system 100 may include a side spanner 416. As used in this disclosure a "side spanner" is a molded carbon fiber securing mechanism.

Referring now to FIGS. 5A-C, an embodiment 500 of a system for rolling landing gear is displayed. In FIG. 5A, recoil force 500 includes an extension state 504. As used in this disclosure an "extension state" is a state of operation wherein first wheel 116 is extended to at least prevent first biasing means 132 and/or first skid tube 108 from interacting with the ground. Extension state 504 may allow for first wheel 116 to freely rotate. Extension state 504 may be a result of a recoil force exceeding the threshold force and/or the downward force. In FIG. 5B, recoil force 500 includes an operation state 508. As used in this disclosure an "operation state" is a state of operation wherein first wheel 116 is located within first recess 124. Operation state 508 may be a result of a recoil force being the same as the threshold force and greater than the downward force. In FIG. 5C, recoil force 500 includes a retraction state 512. As used in this disclosure a "retraction state" is a state of operation wherein first wheel 116 is located above first biasing means 132 and/or first skid tube 108, allowing first biasing means 132 and/or first skid tube 108 to interact with the ground. Retraction state 512 may be a result of a recoil force and threshold force being less than the downward force.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for rolling landing gear on an electric vertical take-off and landing aircraft, the system comprising:
    a skid component attached to the aircraft and comprising at least a skid tube oriented laterally to a longitudinal axis of the aircraft;
    at least a wheel journaled on a rotational fulcrum; and
    at least a biasing means attaching the rotational fulcrum to the skid tube, wherein the biasing means comprises at least a spring configured to exert a recoil force resisting upward displacement of the rotational fulcrum with respect to the skid tube, wherein the at least a spring includes a first quantity of carbon prestressed springs and a second quantity of fiberglass prestressed springs.

2. The system of claim 1, wherein the first quantity is more than the second quantity.

3. The system of claim 1, wherein the first quantity and the second quantity are layered to produce a layered spring assembly.

4. The system of claim 1, wherein the at least a spring includes at least a flex point.

5. The system of claim 1, wherein the at least a skid tube includes at least a recess.

6. The system of claim 5, wherein the at least a recess houses the at least a wheel.

7. The system of claim 1, wherein the at least a spring extends and retracts the at least a wheel as a function of a change in a downward force.

8. The system of claim 7, wherein the downward force exceeds the recoil force upon landing.

9. The system of claim 1, wherein the at least a spring has two ends and a central section, wherein the rotational fulcrum is attached to the central section, and wherein the two ends are affixed to the at least a skid tube.

10. The system of claim 9, wherein at least an end of the at least a spring is attached to the aircraft by a machined aluminum clamp.

11. The system of claim 1, wherein the at least a wheel has a rating force.

12. The system of claim 11, wherein the rating force is more than a threshold landing force.

13. The system of claim 11, wherein the rating force includes a rating load.

14. The system of claim 11, wherein the rating force is determined as a function of a ply rating.

15. The system of claim 14, wherein the ply rating is determined as a function of a bias ply.

16. The system of claim 14, wherein the ply rating is determined as a function of a radial ply.

17. A system for rolling landing gear on an electric vertical take-off and landing aircraft, the system comprising:
    a skid component attached to the aircraft and comprising at least a skid tube oriented laterally to a longitudinal axis of the aircraft;
    at least a wheel journaled on a rotational fulcrum; and
    at least a biasing means attaching the rotational fulcrum to the skid tube, wherein the biasing means comprises at least a spring configured to exert a recoil force resisting upward displacement of the rotational fulcrum with respect to the skid tube, wherein the at least a spring has two ends and a central section, wherein the rotational fulcrum is attached to the central section, and wherein the two ends are affixed to the at least a skid tube.

18. The system of claim 17, wherein at least an end of the at least a spring is attached to the aircraft by a machined aluminum clamp.

19. The system of claim 17, wherein the at least a spring includes at least a fiberglass prestressed spring.

20. The system of claim 17, wherein the at least a spring includes at least a carbon prestressed spring.

* * * * *